Figure 1:
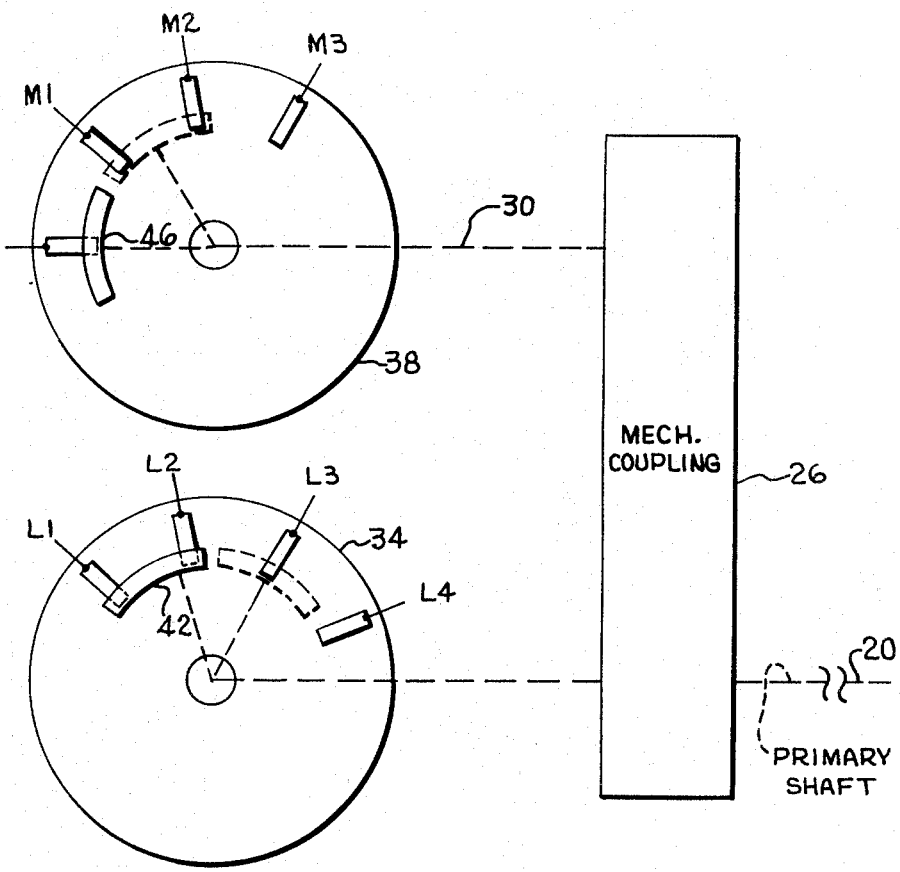

United States Patent Office 3,221,325
Patented Nov. 30, 1965

3,221,325
ELECTROMECHANICAL SIGNAL CONVERSION APPARATUS
Ernest Hartog, 900 Riverside Drive, New York, N.Y.; William O. Yaeger, 168 Hamilton St., East Orange, N.J.; and Edgar Rice, 36 Burnside Place, Wayne, N.J.
Filed Apr. 27, 1962, Ser. No. 190,611
2 Claims. (Cl. 340—347)

This invention relates to electromechanical signal conversion apparatus and to apparatus for converting angular motion to electrical output signals, particularly decimal signals.

Many types of apparatus are known for converting angular motion such as the rotation of a shaft to an electrical output in a particular code. However, such apparatus generally is not adapted for providing in simple fashion a direct decimal representation. In addition, in apparatus including a plurality of related rotating mechanical elements, provision must be made for avoiding ambiguities between the rotating elements themselves and ambiguities which might arise when a rotating element proceeds from one step to the next in its cycle of operation. The prior art is generally cognizant of the problem of ambiguities, and solutions are provided for avoiding such ambiguities. However, such solutions do not have the simplicity and efficacy of the arrangement provided by the present invention. In addition, the prior art is limited in its ability to operate with different scale representation and to recycle on different scales.

Accordingly, the principles and objects of the present invention are concerned with the provision of improved and relatively simple apparatus for providing direct decimal electrical signals corresponding to the angular rotation of a shaft, the apparatus being adapted to avoid ambiguities in rotation.

The objects of the invention are also concerned with provision of improved analog-to-decimal signal conversion apparatus which can be readily modified for use with different scale representations.

Briefly, the apparatus of the invention comprises a mechanical signal source including a primary rotatable shaft coupled to one or more auxiliary shafts which are interrelated in a predetermined manner so that each provides its own representative portion of the whole. Thus, for example, one shaft might provide a units representation, another a tens representation, etc. Each shaft is associated with a separate coded disk which carries a plurality of electrical contact elements and an electrical contact brush for making contact with the contact elements. Each contact element represents a unit of the scale of the coded disk on which it is formed.

According to the invention, each contact brush is of such a size that, as its shaft rotates, the brush touches first one contact element, then two adjacent elements simultaneously, then the next element alone, etc. Each contact member carried by a disk is separately coupled to suitable circuitry for providing a decimal electrical output as the brush makes contact with it, and, in addition, the circuitry is designed to prevent ambiguity when two adjacent elements are contacted by the brush. The circuitry also includes provision for preventing ambiguities when the brushes of more than one coded disk contacts two adjacent elements.

Figure 2:
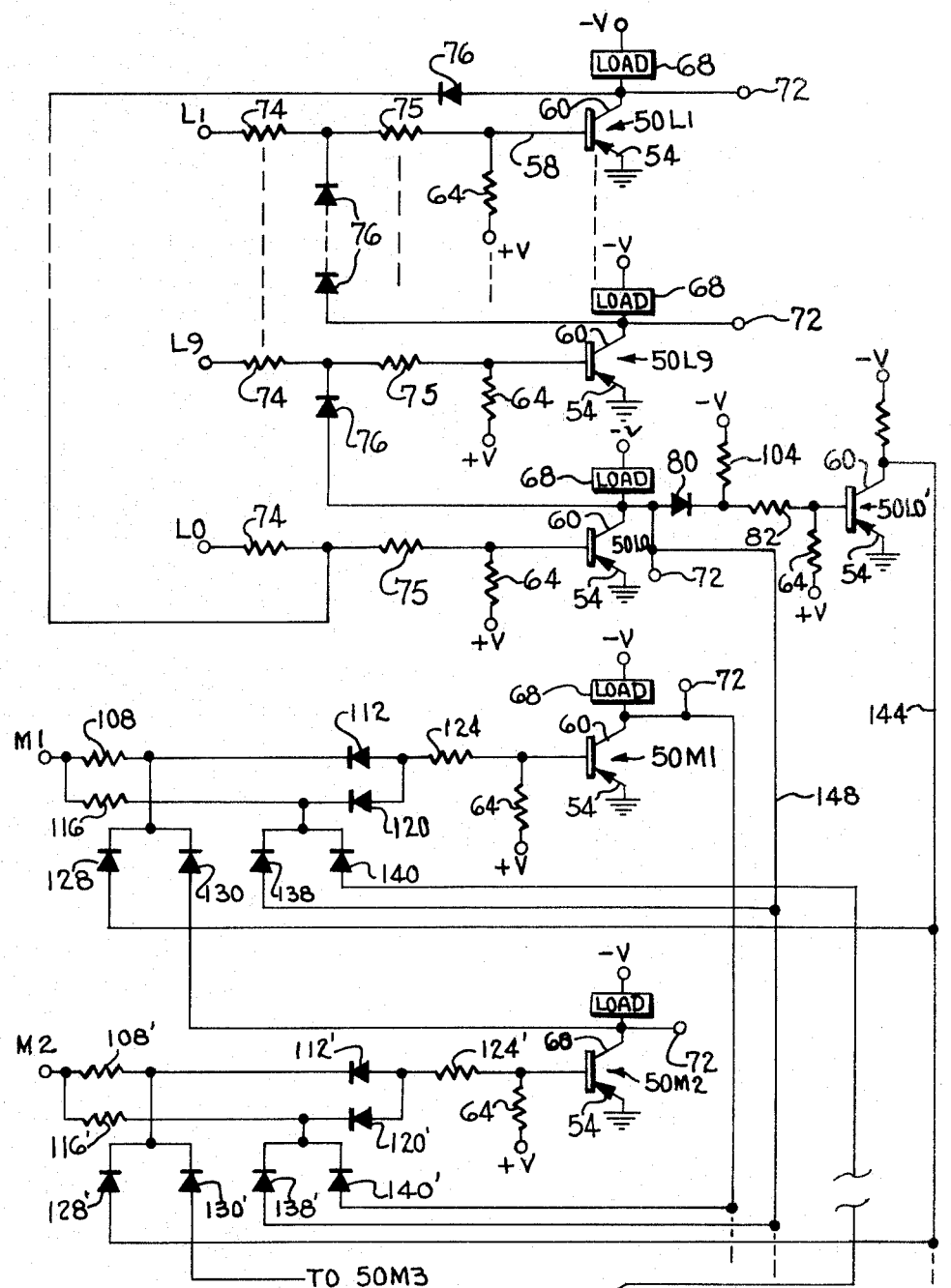

The invention is described in greater detail by reference to the drawing wherein:

FIG. 1 is a representation, partly schematic, of the mechanical portion of the invention; and FIG. 2 is a schematic representation of an electrical circuit embodying the invention.

Referring to the drawing, the apparatus of the invention includes a primary shaft 20 which is coupled to apparatus (not shown), the angular rotation of which is to be converted to a decimal electrical representation. The shaft 20 is coupled through suitable gearing means 26 to one or more auxiliary shafts 30, one of which is shown. Shafts 20 and 30 are so geared that any desired rotational relationship between the shafts may be achieved.

According to the invention, one or more coded disks are provided which carry electrical contact elements, each of which constitutes a portion of the total decimal representation. Each of the contact elements is adapted to be separately contacted by a brush whereby an electrical signal is obtained. Thus, it is clear that the coded disks may be stationary and the brush associated with each may rotate, or each brush may be stationary and the associated disks may rotate. In the following description of the invention, it is assumed that the coded disks are stationary and the brushes rotate.

For purposes of illustration, two coded disks 34 and 38 suitably supported with respect to shafts 20 and 30, respectively, represent, one the least significant digit, and the other the more significant digit of the decimal readout to be provided. Thus, for example disks 34 and 38 may represent the units and tens elements, respectively, of the total decimal cycle. The coded disk 34 representing the least significant digit carries ten electrical contact elements, L1, L2, . . . L0, only four of which are shown in FIG. 1. The coded disk 38 representing the more significant digit similarly carries any desired number of electrical contact elements, M1, M2, . . . M$n$, only four of which are shown in FIG. 1.

Each shaft carries an electrical contact brush which is adapted to make electrical contact with the conductive elements carried by the associated coded disk. Thus, shaft 20 carries a brush 42, and shaft 30 carries a brush 46. According to the invention, each brush is of such a size that, as a shaft, for example shaft 20, and its brush 42 rotate with respect to the associated coded disk, the brush first contacts one contact element, for example, L1 alone, and then it contacts both elements L1 and L2, then element L2 alone, both elements L2 and L3, and so forth. Brush 46 similarly contacts element M1 alone, both elements M1 and M2, M2 alone, both elements M2 and M3, and so forth.

In the electrical circuit portion of the invention shown in FIG. 2, a transistor switch 50 is coupled to each contact element on the coded disks. It is clear that PNP or NPN transistors may be used; for purposes of illustration, PNP transistors are shown and described. Each transistor includes emitter, base, and collector electrodes 54, 58, and 60, respectively. Some of the connections common to each transistor include the connection of the emitter electrodes to ground and the base electrodes to a positive power source through a resistor 64. In addition, each collector electrode is coupled through a load 68, such as a neon bulb, to a negative power source. Each collector is also provided with a terminal 72, by which it may be connected to a decimal readout device, printing mechanism, or the like.

Now, fererring to coded disk 34 which has been arbitrarily designated as representing the least significant digit portion of a decimal representation, each contact element L thereof extends through a resistor network to the input or base electrode of one of the transistors. Thus, contact L1 is coupled through resistors 74 and 75 to the base electrode of transistor 50L1; L2 is coupled through resistors 74 and 75 to the base of transistor 50L2; and the other contact elements L are similarly connected to their associated transistors. In the least significant digit portion of the circuit, each collector electrode is also coupled through a diode 76 to a point on the resistor network 74–75 associated with the adjacent lower-numbered transistor. Thus, the collector of 50L0 is connected to the anode of a diode 76, the cathode of which is connected to a point on the resistor network of transistor 50L9. Similarly, the collector of 50L9 is coupled through a diode 76 to the resistor network of transistor 50L8. The collector of the transistor 50L1 is coupled through a diode 76 to the resistor network of transistor 50L0.

The collector electrode of transistor 50L0 is also coupled through diode 80 and resistor 82 to the base electrode of transistor 50L0′ which is adapted to operate inversely to transistor 50L0; that is, when 50L0 is on, 50L0′ is off, and vice versa. The cathode of diode 80 is also coupled through a resistor 104 to a negative bias source.

Referring now to the more significant digit portion of the circuit, each contact element M of disk 38 is coupled through an OR circuit to the base electrode of a transistor 50. Thus, M1 is coupled through two parallel paths, one including a resistor 108 and diode 112, and the other including resistor 116 and diode 120, through a common base resistor 124 to the base electrode 58 of transistor 50M1. Each path of the OR circuit is coupled through its own separate AND gate to other portions of the circuit. Thus, the cathode of diode 112 is coupled to the cathodes of diodes 128 and 130. The cathode of diode 120 is coupled to the cathodes of diodes 138 and 140. The anode of diode 128 is coupled to a bus 144 which is connected to the collector of transistor 50L0′. The anode of diode 130 is connected to the collector of the following transistor 50M2. The anode of diode 138 is connected to a bus 148 which is connected to the collector of transistor 50L0. And the anode of diode 140 is connected to the collector of the preceding transistor, in this case, transistor 50M0.

Contact element M2 is similarly connected through an OR gate to transistor 50M2, including a first path consisting of resistor 108′ and diode 112′ and a second path consisting of resistor 116′ and diode 120′, both paths being coupled through resistor 124′ to the base of transistor 50M2. The cathode of diode 112′ is coupled through an AND gate including diode 128′ coupled to bus 144 and diode 130′ coupled to the collector of the next adjacent transistor 50M3. The cathode of diode 120′ is coupled through an AND gate including diode 138′ coupled to bus 148 and diode 140′ coupled to the collector of transistor 50M1.

The other contact elements M are similarly connected.

In operation of the apparatus of the invention, as the primary shaft rotates, the auxiliary shaft rotates and the brushes contact the elements of the coded disks at a rate determined by the various gearing arrangements.

Referring to the contact elements of the least significant digit, as the brush 42 contacts a single element, for example L9, transistor 50L9 is turned on and its load 68 is energized. The same action occurs for any single element L contacted by the brush. If two adjacent elements are contacted, for example L9 and L0, transistor 50L0 is turned on and its collector is clamped to about ground potential. The resultant current through diode 76 from the collector of transistor 50L0 prevents the flow of base current to transistor 50L9, which is thus turned off and held off. The same action occurs whenever a brush overlaps two contact elements. In similar fashion, each of the contacts M on disk 38 is energized in order as the shafts 20 and 30 perform the required rotations determined by the gearing between them.

Referring now to the more significant digit code disk 38 and the relationship between the two disks, assuming that the brush 46 contacts M1 and that L9 is still energized and transistor 50L9 is on, then transistor 50L0 is off and transistor 50L0′ is on. Thus, the cathode of diode 128 is at ground and a current flows through the diode and resistor 108 into M1. This current raises the cathodes of diode 128 and diode 112 to approximately ground potential, and, since the anode of diode 112 is also at close to ground potential, diode 112 is practically non-conducting. The anodes of diodes 138 and 140 are coupled to the collectors of off transistors 50L0 and 50M0, these collectors being at a relatively high negative potential, thus reverse biasing diodes 138 and 140. Both diodes being cut-off, normal base current will flow through diode 120, and transistor 50M1 will conduct.

If there is an overlap between M1 and M2 or any other contacts (before L9 and L0 overlap), then diodes 128 and 128′ are grounded because they go to the collector of transistor 50L0′ which is at ground because the transistor 50L0′ is conducting. Thus, the paths including diodes 112 and 112′ are disabled. The anodes of diodes 138 and 140 go to high collectors, so that the path including diode 120 is open and transistor 50M1 stays on. Transistor 50M2 cannot go on because diode 128′ goes to the collector of transistor 50L0′ which is at ground, and diode 140′ goes to the grounded collector of transistor 50M1.

With M1 and M2 still overlapping, if now, the brush transfers from L9 to L0, L0 receives full current, transistor 50L0 turns on, and transistor 50L0′ turns off. Now, the anodes of diodes 138 and 138′ are grounded and disable the OR gate paths including diodes 120 and 120′. Diodes 128′ and 130′ can conduct so that transistor 50M2 is forced on and grounds diode 130 and prevents transistor 50M1 from turning on, even if it tries to turn on due to brush overlap.

From the foregoing description of the invention, it is clear that the relationship between the coded disks of a converter system may be varied as required and, in a decimal system, the more significant disk may be designed to provide substantially any total scale representation.

Other modifications will also be apparent to those skilled in the art.

What is claimed is:
1. Electromechanical signal conversion apparatus including
    a first rotatable member having a first series of contacts adapted to be energized consecutively and to produce signals when energized,
    a first series of switching devices having input and output electrodes with each device having its input coupled to one contact to receive energizing signals therefrom,
    the output of each device being coupled both to a load and through a diode to the input of the device behind it in the series so that each device, as it is turned on, holds off the device behind it in the series,
    one of said first devices in the first series having its output coupled to the input of an auxiliary switching device which has input and output electrodes, said one device and said auxiliary device operating inversely so that, when one is on, the other is off and vice-versa,
    a second rotatable member having a second series of contacts adapted to be energized consecutively and to produce signals when energized,
    a second series of switching devices having input and output electrodes, each second contact being connected to the input electrode of its associated switching device through a two-part OR gate, each branch of each OR gate being coupled to a two-part AND gate,
    one AND gate being coupled both to the output of said auxiliary device in said first series and to the output of the next adjacent device in the second series,
    the other AND gate being coupled both to the output of said one device in said first series and to the output of the device preceding it in the second series, the switching devices of said first and second series thus being interrelated to control the generation of the desired signal when two contacts are energized simultaneously in both said first and second series and when one contact in said first series is energized simultaneously with a contact in said second series.

2. Electromechanical signal conversion apparatus including a first rotatable member having a first series of contacts adapted to be energized consecutively, a first series of transistors having input and output electrodes with each transistor having its input coupled to one contact and its output coupled to a load, the output of each transistor also being coupled through a diode to the input of the transistor behind it in the series so that each transistor, as it is turned on, holds off the transistor behind it in the series, one of said first transistors having its output coupled to the input of an auxiliary transistor which has input and output electrodes, said one transistor and said auxiliary transistor operating inversely so that, when one is on, the other is off and vice-versa, a second rotatable member having a second series of contacts adapted to be energized consecutively, a second series of transistors having input and output electrodes, each second contact being connected to the input electrode of its associated transistor through a two-part OR gate, each branch of each OR gate being coupled to a two-part AND gate, one AND gate being coupled both to the output of said auxiliary transistor in said first series and to the output of the next adjacent transistor in the second series, the other AND gate being coupled both to the output of said one transistor in said first series and to the output of the transistor preceding it in the second series, the transistors of said first and second series thus being interrelated to control the generation of the desired signal when two contacts are energized simultaneously in both said first and second series and when one contact in said first series is energized simultaneously with a contact in said second series.

References Cited by the Examiner
UNITED STATES PATENTS 3,022,500   2/1962   Stupar _____ 340—347

MALCOLM A. MORRISON, *Primary Examiner.*

D. M. ROSEN, K. R. STEVENS, *Assistant Examiners.*